ated Feb. 7, 1939

2,146,201

UNITED STATES PATENT OFFICE 2,146,201

ALKYLOLAMINE RECOVERY

Willem Coltof, Amsterdam, Netherlands, assignor to Shell Development Company, San Francisco, Calif., a corporation of Delaware No Drawing. Application February 8, 1937, Serial No. 124,692. In the Netherlands February 26, 1936

12 Claims. (Cl. 260—584)

This invention relates to the recovery of alkylolamines from their compounds with carboxylic acids and especially to the decomposition of alkylolamine soaps of fatty acids, such, for example, as those which are usually present in the extracts obtained in the refining of animal, fish and vegetable oils, fats, waxes, resins and the like with alkylolamines.

One object of my invention is the recovery of alkylolamines from carboxylic acid compounds thereof, either alone or in admixture with other materials, without substantial loss from side reactions, particularly amidization reactions. My invention has for a further object the recovery of such alkylolamines with minimum distillation expense and particularly the provision of a process whereby the alkylolamine may be recovered in a substantially pure concentrated form suitable for use without redistillation.

For the purpose of making my invention more clear it will be described with more particular reference to the recovery of alkylolamines, and particularly ethanolamines, from the extracts obtained during refining of animal and vegetable oils, fats and waxes of the ester type. It will be understood, however, that this implies no limitation on my invention as the same procedure may be used for the recovery of alkylolamines from the same, or other suitable compounds thereof whether such compounds are in the pure state or in admixture with similar or other constituents. The process of my invention is thus applicable to the recovery of alkylolamines from carboxylic acid salts thereof irrespective of the source or nature of the salt.

When alkylolamines are used to refine oils, fats or waxes of the ester type, for example, as described in United States Patent No. 1,885,859, an extract is obtained which comprises principally free alkylolamine, alkylolamine soaps of fatty acids, and colorants, albumens and other impurities usually in lesser amounts. It has been proposed to recover alkylolamine from such extract mixtures by steam distillation under reduced pressure. I have found this procedure to have several disadvantages however. In the first place the formation of amidols is not eliminated in industrial scale steam distillations and furthermore not only is the distillation rendered very expensive by the large amounts of water which must be evaporated but also the product obtained being a dilute aqueous solution requires redistillation before it can be returned to the refining process.

These disadvantages may be avoided by the process of my invention which is characterized by two important departures from the prior art. The first, and most essential, feature of my process comprises bringing the carboxylic acid compound of the alkylolamine to be recovered very rapidly to a temperature at which it is decomposed at a rate at which amidization is substantially avoided. This may very suitably be effected by flash distillation, as by contacting the alkylolamine soap with heating means, such for example as a heated surface as in a film evaporator or the like. In the case of ethanolamine extracts or the like, such surfaces are advantageously maintained at temperatures upwards of 150° C. and more preferably at about 180° C. or higher, which ensures rapid evaporation of the free alkylolamine and water present, followed by the substantially instantaneous decomposition of the soap or soaps and evaporation of the liberated ethanolamine, amidization being thus substantially precluded.

A second important feature of my process is the restriction of the amount of water present during the soap decomposition and distillation step. I have found that the presence of large amounts of water, whether added as a preliminary diluent or as steam during distillation or both, impedes the recovery of alkylolamines from their soaps. Not only is the heat consumption increased thereby but also the capacity of the apparatus is reduced. Small quantities of water, not over 20% and most preferably between about 10% and 20% based on the water-free weight of extract, are advantageous in facilitating alkylolamine distillation and promoting good recovery however. The absence of, or presence of but small amounts of, water in conjunction with the use of elevated distillation temperatures has the additional advantage that very little trouble is experienced in the distillation plant. Moreover, it has been found that steam is not required under the conditions of the present process, for promoting the dissociation of alkylolamine soaps, nor does it preclude, in prior procedures, amidization.

For efficient alkylolamine recovery, it is advisable to have all the alkylolamine, both free and combined, evaporate substantially instantaneously and most preferably to promptly separate the vaporized alkylolamine from the free fatty acid simultaneously liberated so that there is minimum opportunity for either recombination or amidization. This instantaneous evaporation may advantageously be effected by flash distillation of the extract in the form of a film on a heated surface supplied with a constant heat surplus. For adequate splitting of the soap a minimum temperature of 150° C. is recommended. Better recovery is usually possible with temperatures of at least about 180° C. and most preferably above 200° C. The upper distillation temperature limit is determined by the nature of the extract involved and is adjusted so that excessive amounts of fatty acid or other impurities do not distil over with the alkylolamine.

Under these conditions and when the water present is limited, as preferred, to not more than 20% by weight, the capacity of the apparatus will depend on the amount of heat supplied per unit of heating surface and time and on the composition of the mixture being treated. After fixing the rate of heat input, the feed rate may be readily adjusted to give good recovery. At feed rates which are too low, the temperature is high and while flash distillation takes place with good vaporization of ethanolamine, much fatty acid passes over as well so that the desired separation is not effected. At feed rates which are too high for the given heat input, the temperature is low so that ordinary instead of flash distillation may result with consequent incomplete decomposition of the soaps as well as much undesirable amidization.

The following example showing the results obtainable by a procedure comprised within the scope of my invention also illustrates in somewhat more detail how the process may be applied.

An extract obtained by treating cocoa-butter with mono-ethanolamine and consisting of 19.9% by weight of free mono-ethanolamine, 54.2% by weight soaps of mono-ethanolamine with higher molecular fatty acids (corresponding to 9.8% by weight free mono-ethanolamine), a few per cent. of water and further of other substances extracted from the cocoa-butter, was subjected to distillation under a pressure of 17 cm. mercury. The place at which the extract entered the distillation column was kept at a temperature of 250° C. The distillate obtained constituted 41.8% by weight of the extract introduced and consisted of 70.0% by weight of (free) mono-ethanolamine. Calculated on the extract, therefore, out of 29.7% by weight of free and bound mono-ethanolamine present therein 29.25% by weight had been recovered in a free condition. The other 0.45% by weight were traced in the residue of the distillation in the form of amidols. Through the formation of amidol, therefore, a quantity of ethanolamine has been lost, amounting to less than 5% calculated on the ethanolamine bound in the form of soap in the extract. When applying the processes hitherto known this percentage always amounted to at least 20%.

My process is capable of many variations, not only with respect to the type of alkylolamine salts or soaps to which it may be applied but also in regard to the manipulative details chosen. Thus, for example, instead of using flash distillation from a heated surface, the same result may be effected by suitable hot gaseous contact as, for example, between a stream of the extract and a stream of preheated nitrogen or the like. It will also be clear that while my invention operates at greatest advantage in the absence of, or at least, presence of only limited amounts of, water, it may also be satisfactorily used when larger amounts are present, as where dilute alkylolamine soap solutions are unavoidably present or for other reasons.

The process may be applied to extracts obtained by the use of an alkylolamine or a mixture of alkylolamines either alone or admixed with other solvents or diluents, including, for example, ammonia or suitable alcohols, hydrocarbons, esters or ketones, etc., whether or not combined with alkali or other auxiliary treatment. Instead of the monoethanolamine shown in the foregoing example, di- or tri-ethanolamine or methyl monoethanolamine or dimethyl monoethanolamine or higher homologues may be similarly recovered.

The alkylolamine soaps may be considered as the compounds resulting from the interaction of an individual alkylolamine with an individual carboxylic acid or may comprise mixtures which can be obtained from one or more alkylolamines reacting with several or with only one acid. The fatty acid component of the soap may be a saturated carboxylic acid such as palmitic, stearic or like acid or an unsaturated acid as oleic acid, elaidic acid, etc. Cyclic substituted acids and/or polycarboxylic acids, e. g., hydnocarpic, chaulmoogric, malonic, adipic, suberic, azelaic, sebacic, etc., may be present in the alkylolamine compounds treated. Where the boiling point of the free acid is lower than that of the alkylolamine used a satisfactory separation may be effected by recovering the latter as bottoms instead of as distillate as described in the illustrative example. Sub-atmospheric pressures are advantageous in promoting rapid removal of products and consequently reducing the time of exposure to the high distillation temperature which is characteristic of my process.

My invention offers many advantages over prior methods of recovering alkylolamines from their soaps. By its use the capacity of the apparatus may be greatly increased, the dangers from foaming and consequent contamination of the product are reduced and the distillation expense is reduced since a pure or only slightly diluted alkylolamine may be recovered. The yield of alkylolamine is greatly improved and the quality of the acid recovered as a by-product is enhanced by the reduced amidization provided. The process is particularly adapted to continuous operation but may also be carried out intermittently or batchwise. Still other changes may be made without departing from the spirit of my invention which is to be regarded as limited only by the terms of the accompanying claims, in which it is my intention to claim all novelty inherent therein as broadly as is possible in view of the prior art.

I claim as my invention:

1. The process for the recovery of free alkylolamine from a compound thereof with a carboxylic acid which comprises substantially instantaneously bringing said compound to a temperature above 150° C. but below the temperature at which said carboxylic acid is substantially vaporized under the reaction conditions whereby said alkylolamine compound is decomposed to the corresponding free acid and alkylolamine and the decomposition products are separated while amidization is substantially avoided.

2. The process for the recovery of free alkylolamine from an alkylolamine extract of oils, fats and waxes of the ester type which extract contains an alkylolamine soap which comprises bringing said extract into contact with heating means maintained at a temperature above 150° C. but below the temperature at which the carboxylic acid corresponding to said soap is substantially vaporized at the operating pressure whereby said soap is substantially instantaneously decomposed with liberation of alkylolamine vapor before amidization occurs without substantial dilution of the extract with water.

3. The process for the recovery of free alkylolamine from an alkylolamine soap which comprises bringing said soap substantially instantaneously to a temperature upwards of 150° C. but below the temperature at which the fatty acid liberated thereby is substantially vaporized under the reaction conditions while working under a pressure of less than 760 mms. of mercury whereby amidization is substantially avoided.

4. The process for the recovery of free alkylolamine from an alkylolamine extract obtained from a member of the class consisting of oils, fats and waxes of the ester type which extract contains an alkylolamine soap which comprises subjecting said extract to flash distillation at a temperature above 180° C. but below that at which the carboxylic acid corresponding to said alkylolamine soaps are substantially vaporized under the reaction conditions whereby the corresponding free acid and alkylolamine are separately recovered.

5. The process for the recovery of free alkylolamine from an alkylolamine extract obtained from a member of the class consisting of oils, fats and waxes of the ester type which comprises flash distilling said extract under a pressure less than 760 mms. of mercury at a temperature above 150° C. at which the alkylolamine soap content thereof is substantially decomposed to the corresponding free acid and alkylolamine but below that at which said liberated acid appears in the distillate in substantial amount.

6. The process for the recovery of free alkylolamine from an alklolamine extract obtained from a member of the class consisting of oils, fats and waxes of the ester type which extract contains an alkylolamine soap which comprises flash distilling said extract at a temperature above 150° C. but below that at which the carboxylic acid corresponding to said soap is substantially vaporized under the reaction conditions in the presence of not more than about 20% of water based on the weight of water-free extract whereby the alkylolamine content of said soap is liberated and separated from said acid.

7. The process for the recovery of free alkylolamine from an alkylolamine extract obtained from a member of the class consisting of oils, fats and waxes of the ester type which extract contains an alkylolamine soap which comprises flash distilling said extract at a temperature above 150° C. but below that at which the carboxylic acid corresponding to said soap is substantially vaporized under the reaction conditions in the presence of about 10% to about 20% of water based on the weight of water-free extract whereby the alkylolamine content of said soap is liberated and separated from said acid.

8. The process for the recovery of free ethanolamine from an ethanolamine soap while substantially avoiding amidization reactions which comprises flash distilling said soap at a temperature above 180° C. but below that at which the carboxylic acid corresponding to said soap is substantially vaporized under the reaction conditions whereby an ethanolamine is liberated from said soap and substantially instantaneously separated from said carboxylic acid.

9. The process for the recovery of free mono-ethanolamine from a mono-ethanolamine soap while substantially avoiding amidization reactions which comprises flash distilling said soap at a temperature above 180° C. but below that at which the carboxylic acid corresponding to said soap is substantially vaporized under the reaction conditions whereby the corresponding mono-ethanolamine is liberated from said soap and substantially instantaneously separated from said carboxylic acid.

10. The process for the recovery of free di-ethanolamine from a di-ethanolamine soap while substantially avoiding amidization reactions which comprises flash distilling said soap at a temperature above 180° C. but below that at which the carboxylic acid corresponding to said soap is substantially vaporized under the reaction conditions whereby the corresponding di-ethanolamine is liberated from said soap and substantially instantaneously separated from said carboxylic acid.

11. The process for the recovery of free tri-ethanolamine from a tri-ethanolamine soap while substantially avoiding amidization reactions which comprises flash distilling said soap at a temperature above 180° C. but below that at which the carboxylic acid corresponding to said soap is substantially vaporized under the reaction conditions whereby the corresponding tri-ethanolamine is liberated from said soap and substantially instantaneously separated from said carboxylic acid.

12. The process for the recovery of free mono-ethanolamine from a mono-ethanolamine extract of a vegetable oil which extract contains a soap of said mono-ethanolamine which comprises contacting said extract with heating means at a temperature of at least about 180° C. but below the temperature at which the carboxylic acid corresponding to said soap is substantially vaporized under the reaction conditions whereby the ethanolamine content thereof is substantially instantaneously evaporated in the presence of not more than about 20% of water based on the weight of water-free extract.

WILLEM COLTOF.